(12) United States Patent
Tanaka et al.

(10) Patent No.: US 8,348,800 B2
(45) Date of Patent: Jan. 8, 2013

(54) VEHICLE POWER TRANSMISSION DEVICE

(75) Inventors: Koichi Tanaka, Okazaki (JP); Rikiya Kubo, Okazaki (JP); Yoshihiko Sasaki, Okazaki (JP); Hiroshi Hamaguchi, Nishio (JP)

(73) Assignees: Toyota Jidosha Kabushiki Kaisha, Toyota-shi, Aichi-ken (JP); Aisin Aw Co., Ltd., Anjo-shi, Aichi-ken (JP)

( * ) Notice: Subject to any disclaimer, the term of this patent is extended or adjusted under 35 U.S.C. 154(b) by 98 days.

(21) Appl. No.: 13/033,654

(22) Filed: Feb. 24, 2011

(65) Prior Publication Data

US 2011/0207570 A1 Aug. 25, 2011

(30) Foreign Application Priority Data

Feb. 25, 2010 (JP) ................................ 2010-040537

(51) Int. Cl.
*F16H 48/06* (2006.01)
(52) U.S. Cl. .................... 475/221; 475/160; 475/343
(58) Field of Classification Search .............. 475/5, 159, 475/160, 220, 221, 230, 343
See application file for complete search history.

(56) References Cited

U.S. PATENT DOCUMENTS

| | | | | |
|---|---|---|---|---|
| 2,858,714 | A * | 11/1958 | Black | 475/204 |
| 3,365,986 | A * | 1/1968 | Mazziotti | 475/346 |
| 5,643,127 | A * | 7/1997 | Yoshii et al. | 475/160 |
| 8,096,910 | B2 * | 1/2012 | Shibukawa et al. | 475/159 |
| 2003/0078131 | A1 * | 4/2003 | Nishiji | 475/221 |

FOREIGN PATENT DOCUMENTS

| | | |
|---|---|---|
| DE | 696 11 313 T2 | 8/2001 |
| JP | 61-94426 | 6/1986 |

(Continued)

OTHER PUBLICATIONS

Office Action for Japanese Application No. 2010-040537 dated Feb. 7, 2012.

*Primary Examiner* — Justin Holmes
(74) *Attorney, Agent, or Firm* — Finnegan, Henderson, Farabow, Garrett & Dunner, LLP (57) ABSTRACT

A vehicle power transmission device includes: an input shaft; a planetary gear type speed reducer disposed concentrically to the input shaft to reduce and output rotation input to the input shaft; and a differential gear device disposed adjacently to the input shaft in a shaft center direction, the differential gear device being rotationally driven by the speed reducer to transmit a drive force to a pair of axles disposed on the shaft center while allowing a rotational difference between the axles, the speed reducer including a sun gear that is fit with a shaft end portion of the input shaft in a relatively non-rotatable manner, the sun gear being prevented from relatively moving toward the differential gear device by an annular snap ring fit and attached to an annular snap ring groove formed on an outer circumferential surface of the shaft end portion of the input shaft on the differential gear device side of the sun gear, the differential gear device including a differential case having a cylindrical end portion formed on the sun gear side or a member fixed thereto that is extended to the outer circumferential side of the snap ring, the differential case having a radial distance of an annular gap formed between the cylindrical end portion or the member fixed thereto and the snap ring set smaller than a groove depth of the snap ring groove.

8 Claims, 8 Drawing Sheets

FOREIGN PATENT DOCUMENTS

| | | |
|---|---|---|
| JP | 1-154316 | 10/1989 |
| JP | 2-117410 | 9/1990 |
| JP | 9-72405 | 3/1997 |
| JP | 2001-39179 | 2/2001 |
| JP | 2004-308782 | 11/2004 |
| JP | 2009-174573 | 8/2009 |

* cited by examiner

VEHICLE POWER TRANSMISSION DEVICE

INCORPORATION BY REFERENCE

The disclosure of Japanese Patent Application No. 2010-040537 filed on Feb. 25, 2010 including the specification, drawings and abstract is incorporated herein by reference in its entirety.

BACKGROUND OF THE INVENTION

1. Field of the Invention

The present invention relates to a vehicle power transmission device and particularly to a technique for retaining in a snap ring groove a snap ring fit and attached to an input shaft for preventing slip-off of a sun gear of a speed reducer fit with the input shaft.

2. Description of the Related Art

A vehicle power transmission device is known that includes a cylindrical input shaft, a planetary gear type speed reducer disposed concentrically to the input shaft to reduce and output rotation input to the input shaft, and a differential gear device disposed adjacently to the input shaft in the shaft center direction and rotationally driven by the speed reducer to transmit a drive force to a pair of axles disposed on the shaft center while allowing a rotational difference between the axles. The device is described in Japanese Laid-Open Patent Publication No. 2001-39179, for example.

SUMMARY OF THE INVENTION

If the sun gear of a planetary gear device making up the speed reducer is fit into a shaft end portion of the input shaft in the conventional vehicle power transmission device, the sun gear is prevented from slipping off by a snap ring fit and attached to the shaft end portion on the differential gear device side of the sun gear. However, a fitting force to the input shaft is reduced due to the effect of the centrifugal force acting by rotating the input shaft and, if a thrust force is applied by the sun gear at this timing, the snap ring may not be retained in a snap ring groove.

The present invention was conceived in view of the situations and it is therefore an object of the present invention to provide a vehicle power transmission device capable of retaining in the snap ring groove the snap ring fit and attached to the input shaft for preventing the slip-off of the sun gear fit with the input shaft adjacent to the differential gear device in the shaft center direction.

Means for Solving the Problems

To achieve the above object, the first aspect of the present invention provides (a) a vehicle power transmission device comprising: an input shaft; a planetary gear type speed reducer disposed concentrically to the input shaft to reduce and output rotation input to the input shaft; and a differential gear device disposed adjacently to the input shaft in a shaft center direction, the differential gear device being rotationally driven by the speed reducer to transmit a drive force to a pair of axles disposed on the shaft center while allowing a rotational difference between the axles, (b) the speed reducer including a sun gear that is fit with a shaft end portion of the input shaft in a relatively non-rotatable manner, (c) the sun gear being prevented from relatively moving toward the differential gear device by an annular snap ring fit and attached to an annular snap ring groove formed on an outer circumferential surface of the shaft end portion of the input shaft on the differential gear device side of the sun gear, (d) the differential gear device including a differential case having a cylindrical end portion formed on the sun gear side or a member fixed thereto that is extended to the outer circumferential side of the snap ring, the differential case having a radial distance of an annular gap formed between the cylindrical end portion or the member fixed thereto and the snap ring set smaller than a groove depth of the snap ring groove.

The second aspect of the present invention provides the vehicle power transmission device recited in the first aspect of the invention, wherein (a) an oil seal that forms an oil-tight seal between an inner circumferential surface of the cylindrical end portion of the differential case and the outer circumferential surface of the shaft end portion of the input shaft in the shaft center direction, wherein (b) the radial distance is set such that the snap ring abuts on the cylindrical end portion or the member fixed thereto such that a deformation amount of the oil seal does not exceed a predetermined allowable deformation range even when the differential case and the input shaft are relatively moved in a radial direction.

The third aspect of the present invention provides the vehicle power transmission device recited in the first aspect of the invention, wherein the member fixed to the cylindrical end portion is a cored bar of an oil seal fixed and attached to the inner circumferential surface of the cylindrical end portion for forming an oil-tight seal between the inner circumferential surface of the cylindrical end portion and the outer circumferential surface of the shaft end portion of the input shaft.

The fourth aspect of the present invention provides the vehicle power transmission device recited in the second or third aspect of the invention, wherein the cylindrical end portion has a gap reducing portion that reduces a volume of an annular gap formed between the inner circumferential surface of the cylindrical end portion and the outer circumferential surface of the shaft end portion of the input shaft to decrease an amount of lubricant oil retained in the gap.

The fifth aspect of the present invention provides the vehicle power transmission device recited in any one of the first to fourth aspects of the invention, wherein the input shaft is rotationally driven by an electric motor disposed on the shaft center.

The Effects of the Invention

According to a vehicle power transmission device recited in the first aspect of the present invention, since a differential gear device includes a cylindrical end portion formed on a sun gear side of a speed reducer fit with a input shaft adjacent in a shaft center direction or a member fixed thereto that is extended to the outer circumferential side of the snap ring fit and attached to the input shaft for preventing the slip-off of the sun gear, and the cylindrical differential case set that the radial distance of the annular gap formed between the cylindrical end portion or a member fixed thereto and the snap ring is smaller than the groove depth of the snap ring groove, the snap ring abuts on the inner circumferential surface of the cylindrical end portion before completely slipping off from the snap ring groove even if the snap ring is affected by an external force, for example, a centrifugal force or thrust force and, therefore, the snap ring is retained within the snap ring groove.

According to the vehicle power transmission device recited in the second aspect of the present invention, since the oil seal is included that forms oil-tight seal between the inner circumferential surface of the cylindrical end portion of the differential case and the outer circumferential surface of the shaft end portion of the input shaft and the radial distance is set such that the snap ring abuts on the cylindrical end portion or a member fixed thereto so as not to exceed the predetermined allowable deformation range for an amount of deformation of the oil seal even if the differential case and the input shaft are relatively moved in the radial direction, the amount of deformation of the oil seal is maintained within the allowable deformation range and therefore the sealing state is maintained between the input shaft and the differential case by the oil seal.

According to the vehicle power transmission device recited in the third aspect of the present invention, since the member fixed to the cylindrical end portion is a cored bar of an oil seal fixed and attached to the inner circumferential surface of the cylindrical end portion for forming an oil-tight seal between the inner circumferential surface of the cylindrical end portion and the outer circumferential surface of the shaft end portion of the input shaft, the snap ring 90 abuts on the cored bar of the oil seal before completely slipping off from the snap ring groove even if the snap ring is affected by an external force, for example, a centrifugal force or thrust force and, therefore, the snap ring is retained within the snap ring groove.

According to the vehicle power transmission device recited in fourth aspect of the present invention, since the cylindrical end portion is provided with the gap reducing portion that reduces the volume of the annular gap formed between the inner circumferential surface thereof and the outer circumferential surface of the shaft end portion of the input shaft to decrease an amount of lubricant oil retained in the gap, when the differential case rotates while the gap retains the lubricant oil, a bias force applied to the oil seal from the retained lubricant oil toward the side opposite to the gap is relatively small and, therefore, the oil seal can be restrained from moving toward the side opposite to the gap, i.e., from dropping off from the differential case.

According to the vehicle power transmission device recited in the fifth aspect of the present invention, since the input shaft is rotationally driven by the electric motor disposed on the shaft center, even if the input shaft is rotationally driven by the electric motor rotating at a higher speed as compared to an engine, etc., and the snap ring is affected by a higher centrifugal force, the snap ring is retained in the snap ring groove in a preferred manner.

DESCRIPTION OF THE PREFERRED EMBODIMENTS

Exemplary embodiments of the present invention will now be described in detail with reference to the drawings. In the following embodiments, the figures are simplified or modified as needed and the dimension ratios and shapes of portions or the like are not necessarily accurately depicted.

First Embodiment

Figure 1:
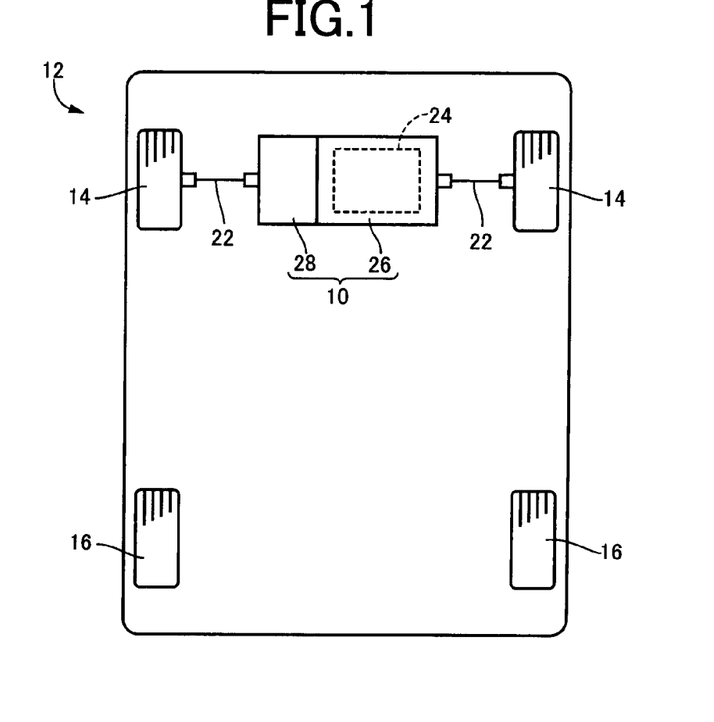
FIG. 1 conceptually depicts a configuration of a drive-train of a vehicle including a vehicle driving device according to one embodiment of the present invention.
Figure 2:
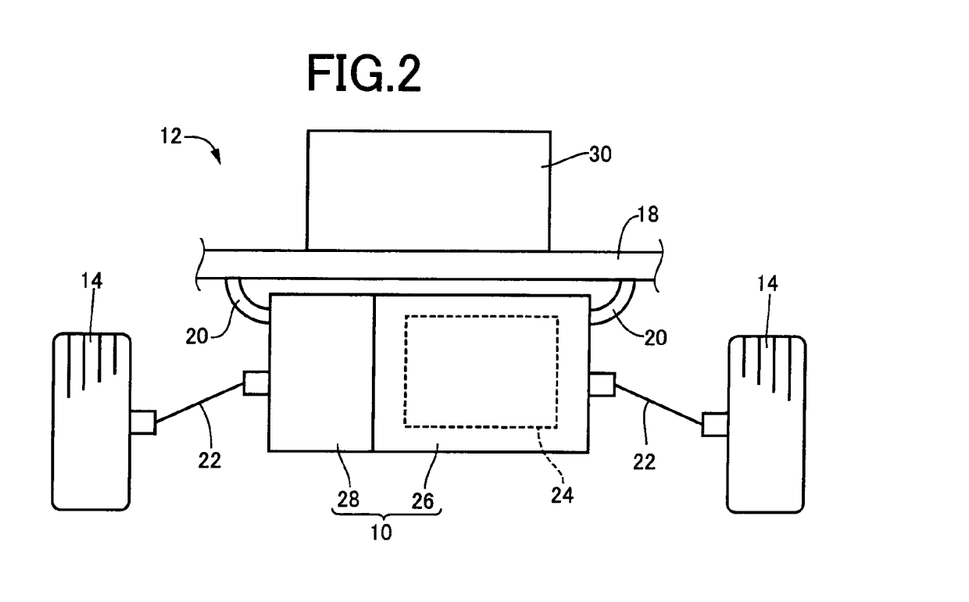
FIG. 2 conceptually depicts a configuration of the drive-train viewed from the back of the vehicle.

FIG. 1 conceptually depicts a configuration of a drive-train of a vehicle 12 including a vehicle driving device 10 according to one embodiment of the present invention. FIG. 2 conceptually depicts a configuration of the drive-train viewed from the back of the vehicle 12. In FIGS. 1 and 2, the vehicle 12 includes pairs of left and right front wheels 14 and rear wheels 16 respectively disposed on the front side and the rear side, and the vehicle driving device 10 fixed via a mount member 20 to a vehicle body 18 as depicted in FIG. 2 on the front side of the vehicle 12 to rotationally drive the pair of the front wheels 14 via a pair of left and right drive shafts (axles) 22.

The vehicle driving device 10 includes a driving portion 26 having an electric motor 24 functioning as a drive source of the vehicle 12 and transversally mounted on the vehicle 12, and a transaxle portion 28 functioning as a power transmission device that reduces and distributes the output rotation of the driving portion 26 to a pair of left and right drive shafts 22. The electric motor 24 is activated by a drive current supplied from an inverter 30 disposed on the vehicle body 18, for example. The vehicle 12 is an FF (front-motor front-drive) type electric vehicle that has the front wheels 14 rotationally driven as drive wheels by the electric motor 24 disposed on the front side.

Figure 3:
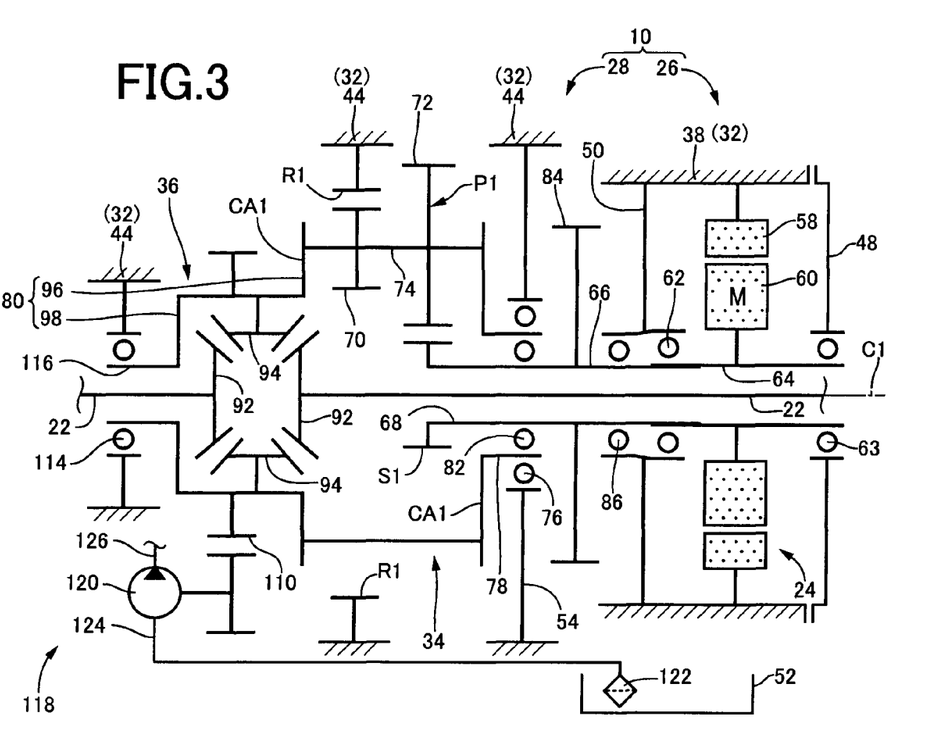
FIG. 3 is a schematic for explaining a configuration of the vehicle driving device of FIG. 1.
Figure 4:
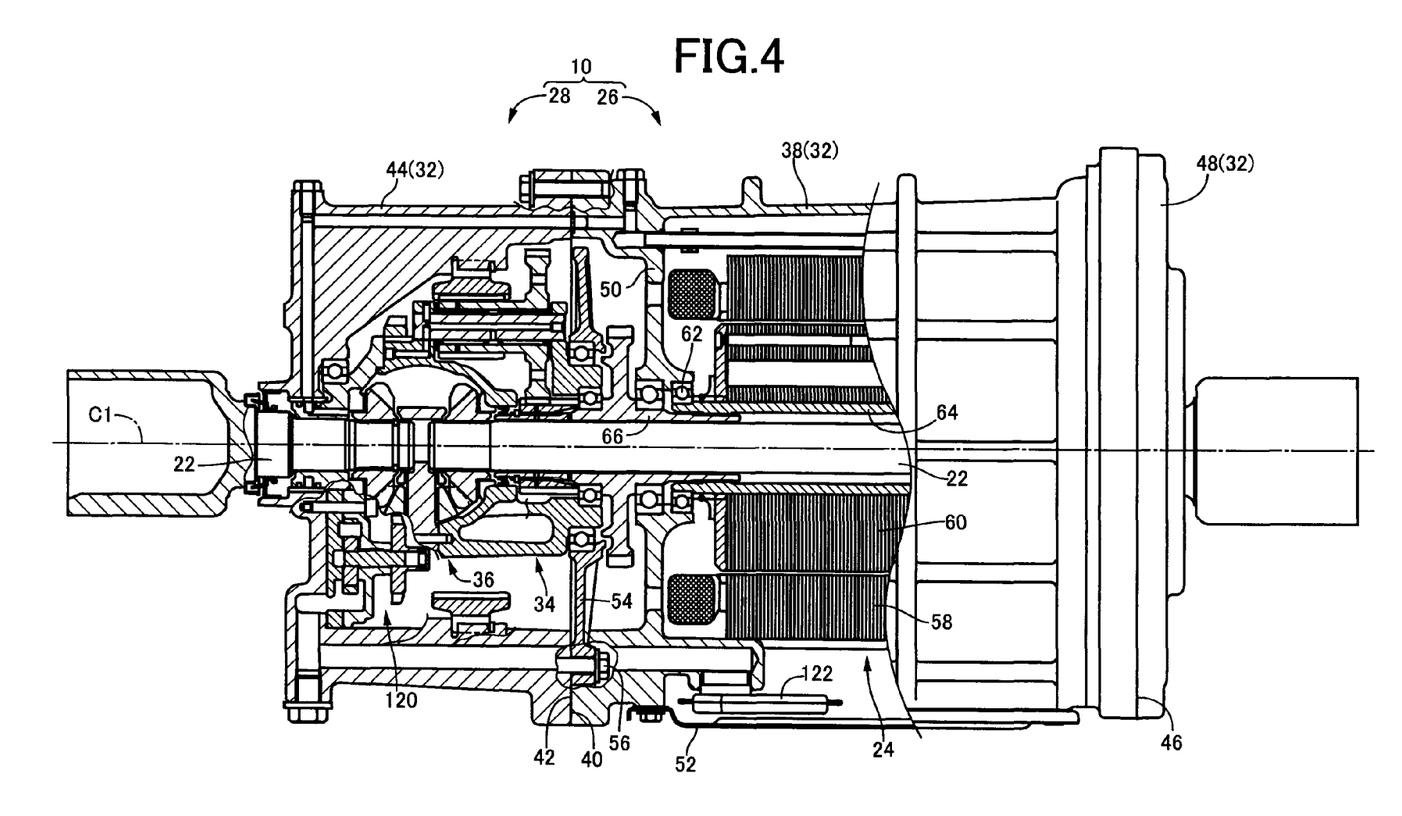
FIG. 4 is a specific longitudinal section diagram of the configuration of the vehicle driving device.

FIG. 3 is a schematic for explaining a configuration of the vehicle driving device 10 of FIG. 1. FIG. 4 is a specific longitudinal section diagram of the configuration of the vehicle driving device 10. In FIGS. 3 and 4, the vehicle driving device 10 includes the electric motor 24, a speed reducer 34, and a differential gear device 36 housed in a three-divided transaxle case 32 and disposed on a common shaft center C1. The driving portion 26 mainly includes the electric motor 24 and the transaxle portion 28 mainly includes the speed reducer 34 and the differential gear device 36.

The transaxle case 32 consists of a cylindrical case 38 mainly housing the electric motor 24, a bottomed cylindrical case 44 mainly housing the speed reducer 34 and the differential gear device 36 and having an opening surface 40 combined with one opening surface 42 of the cylindrical case 38 and fastened to each other by a bolt not shown, for example, and a circular disc case cover 48 combined with the other opening surface 46 of the cylindrical case 38 and fastened to each other by a bolt not shown, for example. The end portion of the cylindrical case 38 on the side of the bottomed cylindrical case 44 has an annular disc partition wall 50 formed and integrally protruding inward from the inner circumference surface. An oil pan 52 is fixed to an opening portion formed on a lower side surface of the cylindrical case 38 such that the opening is closed. This oil pan 52 acts as an oil receiver that receives lubricant oil when the lubricant oil circulating within the transaxle case 32 recirculates to the lower portion of the cylindrical case 38. An annular disc support wall 54 is fixed to the opening surface 40 of the bottomed cylindrical case 44 by a bolt 56, for example. The cylindrical case 38, the bottomed cylindrical case 44, the case cover 48, and the support wall 54 are made of die-cast aluminum alloy, for example.

The electric motor 24 includes a stator 58 integrally fixed to the cylindrical case 38 by, for example, a bolt not shown, a rotor 60 disposed on the inner circumferential side of the stator 58, and a cylindrical output shaft 64 that is disposed on the outer circumferential side of one of the drive shafts 22 disposed on the right of the vehicle 12 depicted in FIG. 1 for the fixation of the rotor 60 and that is rotatably supported at the both end portions by a motor side bearing 62 fit and attached to the partition wall 50 of the cylindrical case 38 and a bearing 63 disposed, for example, on the case cover 48. The output shaft 64 is rotationally driven in accordance with a drive current supplied from the inverter 30 to the stator 58. The electric motor 24 configured as described above is coupled to and rotationally drives an input shaft 66 of the speed reducer 34 coupled to the subsequent stage thereof.

Figure 5:
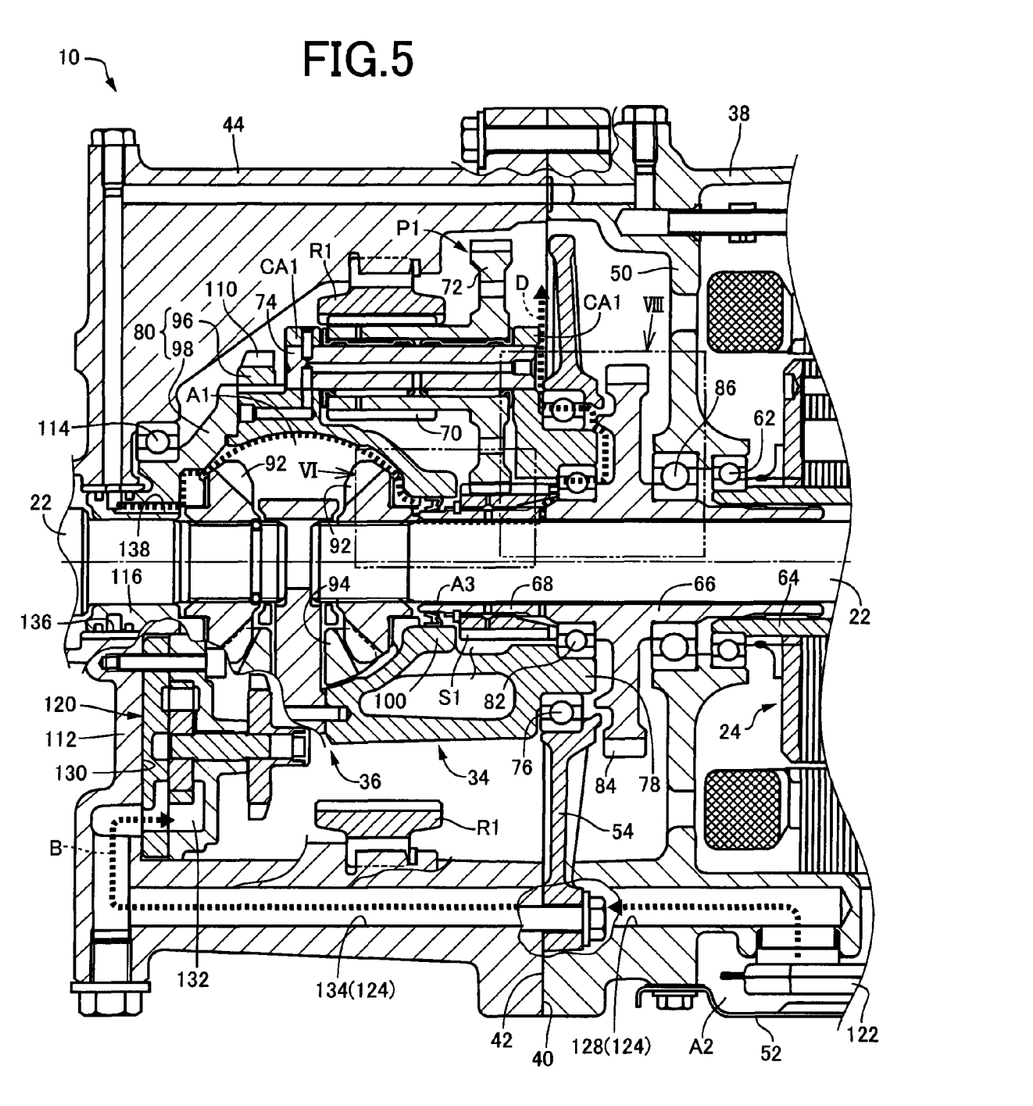
FIG. 5 is a partially enlarged cross-section diagram of the vehicle driving device of FIG. 4.

FIG. 5 is a partially enlarged cross-section diagram of the vehicle driving device 10 of FIG. 4. As depicted in FIGS. 3 and 5, the speed reducer 34 is a planetary gear type speed reducer that includes a cylindrical input shaft (second power transmission member) 66 disposed on the outer circumferential side of the one drive shaft 22 and coupled to the output shaft 64 of the electric motor 24 in a relatively non-rotatable manner, for example, by the spline fitting, a sun gear S1 fit with a shaft end portion 68 of the input shaft 66 on the side further from the electric motor 24, i.e., on the side closer to the differential gear device 36 in a relatively non-rotatable manner, for example, by the spline fitting, a stepped pinion P1 having a small diameter portion 70 and a large diameter portion 72 with the large diameter portion 72 engaged with the sun gear S1, a carrier (first power transmission member) CA1 supporting the stepped pinion P1 via a pinion shaft 74 so as to be rotatable and revolvable about the sun gear S1; and a ring gear R1 fixed to the bottomed cylindrical case 44 concentrically to the sun gear S1 in a relatively non-rotatable manner and engaged with the small diameter portion 70 of the stepped pinion P1. The carrier CA1 corresponds to any one of a plurality of rotating elements making up the speed reducer.

The carrier CA1 has a cylindrical shaft end portion 78 rotatably supported around the shaft center C1 via a first bearing 76 on the inner circumferential side of the non-rotating support wall 54. The carrier CA1 is coupled to a differential case 80 of the differential gear device 36 disposed on the subsequent stage of the speed reducer 34 and acts as an output member of the speed reducer 34. The speed reducer 34 configured as described above reduces the rotation input from the electric motor 24 to the input shaft 66 to output the rotation to the differential gear device 36.

The input shaft 66 is supported by the shaft end portion 78 on the inside via a second bearing 82 radially overlapping with the first bearing 76 and is disposed concentrically to the carrier CA1 in a relatively rotatable manner. The input shaft 66 includes a circular disc parking lock gear (gear portion) 84 protruding outward at a predetermined distance from the second bearing 82 in the shaft center C1 direction. The input shaft 66 is rotatably supported via a third bearing 86 by the partition wall 50 on the side of the parking lock gear 84 closer to the electric motor 24 and is rotatably supported via the second bearing 82 and the third bearing 86 on the both sides of the parking lock gear 84 in the shaft center C1 direction.

Figure 6:
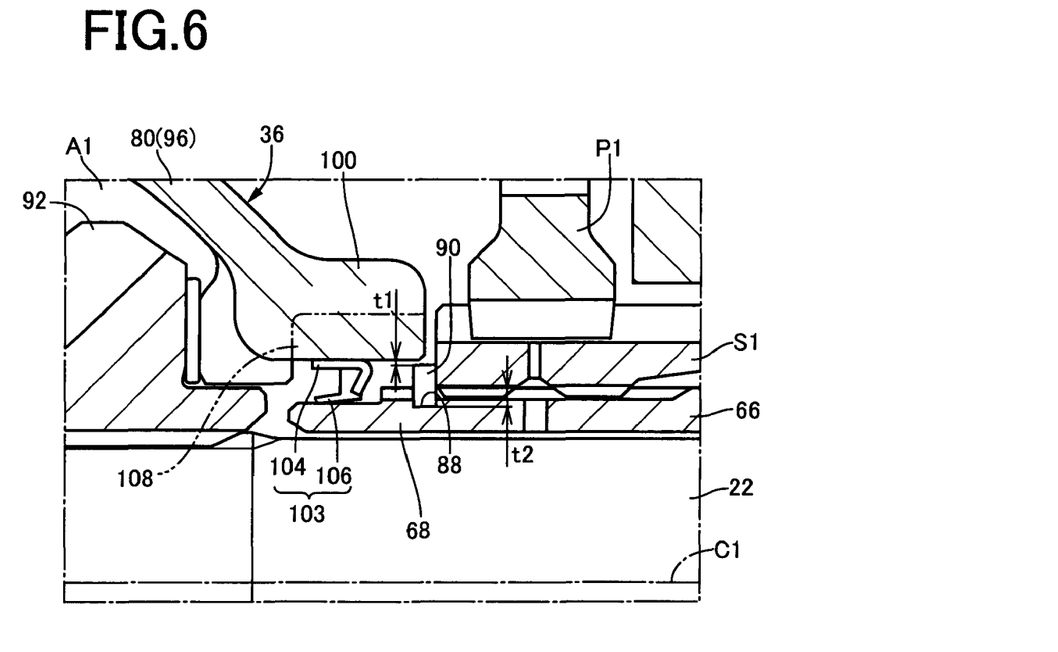
FIG. 6 is an enlarged cross-section diagram of a VI arrow view portion of FIG. 5.

FIG. 6 is an enlarged cross-section diagram of a VI arrow view portion of FIG. 5. As depicted in FIG. 6, the sun gear S1 is prevented from relatively moving toward the differential gear device 36 by an annular snap ring 90 fit and attached into an annular snap ring groove 88 formed in the outer circumferential surface of the shaft end portion 68 of the input shaft 66 on the side of the sun gear S1 closer to the differential gear device 36. Although the sun gear S1 of this embodiment consists of a helical gear and is affected by a thrust force causing a relative movement toward the differential gear device 36, for example, when the electric motor 24 outputs the drive force to drive the vehicle 12 in reverse or when the electric motor 24 is subjected to the regenerative control or the like, the relative movement toward the differential gear device 36 is prevented by the snap ring 90 even in such a case.

As depicted in FIG. 5, the differential gear device 36 includes the two-divided differential case 80, a pair of side gears 92 opposite to each other on the shaft center C1 in the differential case 80, and three pinions 94 disposed at regular intervals in the circumferential direction between the side gears 92 to be engaged with each of a pair of the side gears 92, and is disposed adjacently to the side of the input shaft 66 further from the electric motor 24 in the shaft center C1 direction.

The differential case 80 consists of a first cylindrical differential case 96 disposed on the side closer to the electric motor 24 in the shaft center C1 direction and a second cylindrical differential case 98 disposed on the side of the first differential case 96 further from the electric motor 24 and combined with the first differential case 96 to be fastened to each other by a bolt not shown, for example, and is rotatably disposed around the shaft center C1.

As depicted in FIG. 6, the first differential case 96 includes a first cylindrical end portion (cylindrical end portion) 100 extended toward the shaft end portion 68 of the input shaft 66 and to the outer circumferential side of the snap ring 90 fit and attached to the shaft end portion 68. The first cylindrical end portion 100 is formed such that a radial distance t1 of an annular gap formed between the first cylindrical end portion 100 and the snap ring 90 is set smaller than a predetermined value, i.e., a groove depth t2 of the snap ring groove 88. The snap ring 90 is affected by a centrifugal force to the outer circumferential side when the input shaft 66 is rotated and is affected by the thrust force toward the differential gear device 36 when the sun gear S1 is biased toward the differential gear device 36 by the thrust force at the time of output of the reverse drive force from the electric motor 24 or at the time of the regenerative control of the electric motor 24, for example. Therefore, although the snap ring 90 may be deformed to the outer circumferential side or toward the differential gear device 36, the slip-off thereof is prevented since the snap ring 90 abuts on the inner circumferential surface the first cylindrical end portion 100 before completely slipping off from the snap ring groove 88.

Figure 7:
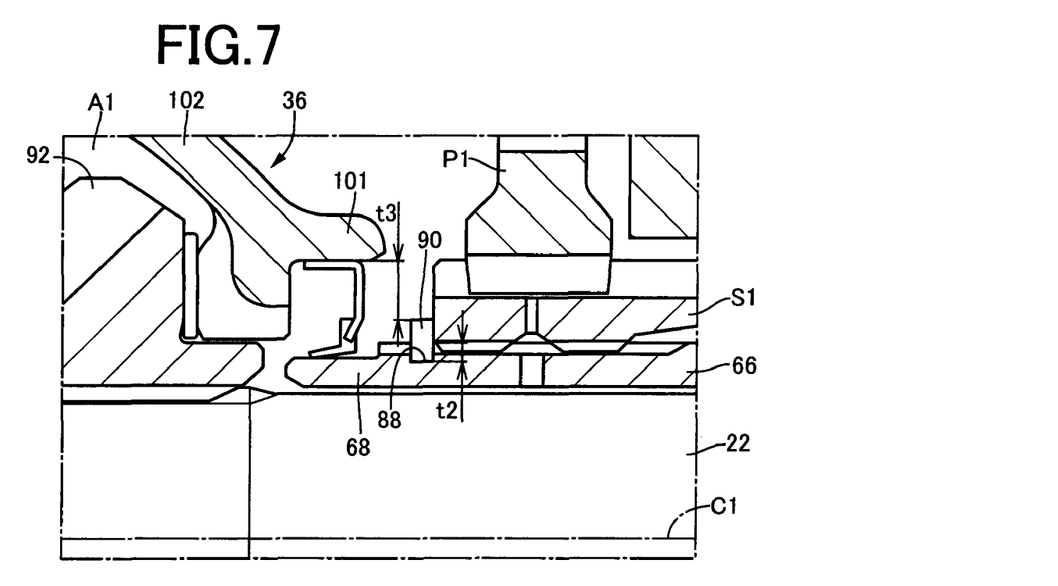
FIG. 7 depicts a conventional differential case having a first cylindrical end portion not extended to the outer circumferential side of the snap ring and is a diagram corresponding to FIG. 6 of the embodiment.

FIG. 7 depicts a conventional differential case 102 having a first cylindrical end portion 101 not extended to the outer circumferential side of the snap ring 90. As depicted in FIG. 7, the differential case 102 has a radial distance t3 of an annular gap formed between the first cylindrical end portion 101 and the snap ring 90 set larger than the groove depth t2 of the snap ring groove 88. Therefore, if the snap ring 90 is deformed to the outer circumferential side and toward the differential gear device 36, the snap ring 90 may slip off from the snap ring groove 88.

Referring to FIG. 6 again, in an annular gap formed between the outer circumferential surface of the shaft end portion 68 of the input shaft 66 in the axial direction of C1 and the inner circumferential surface of the first cylindrical end portion 100, an oil seal 103 is disposed that seals the gap in an oil tight manner. The oil seal 103 of this embodiment is configured with a relatively simple structure because of the narrower (smaller) radial distance of the gap and includes an annular cored bar 104 made of metal, for example, fit and attached to the inner circumferential surface of the first cylindrical end portion 100 and a sealing member (lip) 106 made of synthetic resin, for example, fixed to the inner circumferential side of the cored bar 104. The radial distance t1 is set such that the snap ring 90 abuts on the first cylindrical end portion 100 so as not to exceed a predetermined allowable deformation range in the radial direction of the oil seal 103 even if the input shaft 66 and the first differential case 96 are relatively moved in the radial direction. The allowable deformation range is a radial deformation range of the oil seal 103 causing no leakage of lubricant oil from the oil seal 103 even if the oil seal 103 is deformed in accordance with the radial relative movement of the input shaft 66 and the first differential case 96 and is empirically obtained in advance. Therefore, if the input shaft 66 and the first differential case 96 are relatively moved in the radial direction, the snap ring 90 abuts on the first cylindrical end portion 100 when the deformation of the oil seal 103 is within the allowable deformation range.

Although the annular gap formed between the outer circumferential surface of the shaft end portion 68 and the inner circumferential surface of the first cylindrical end portion 100 described above is in communication with a differential case internal space A1 making up a delivery oil passage 126 described later to be supplied with the lubricant oil, the first cylindrical end portion 100 is provided with a gap reducing portion 108 that reduces the volume of the annular gap to decrease an amount of the lubricant oil retained in the gap. Therefore, when the first differential case 96 rotates while the annular gap retains the lubricant oil, a bias force applied to the oil seal 103 from the retained lubricant oil toward the side opposite to the gap is smaller as compared to the case of absence of the gap reducing portion 108.

Referring to FIGS. 3 and 5, the first differential case 96 is disposed integrally with the carrier CA1 and is rotatably supported around the shaft center C1 via the carrier CA1 and the first bearing 76. To the first differential case 96, the output rotation of the speed reducer 34 is input through the carrier CA1. The first differential case 96 also acts as an input member of the differential gear device 36. The first differential case 96 has outer circumferential teeth 110 circumferentially continuously formed for rotationally driving a pinion 156 of an oil pump 120 described later.

The second differential case 98 is rotatably supported around the shaft center C1 via a differential side bearing 114 on the inner circumferential side of an annular disc bottom wall 112 of the bottomed cylindrical case 44. The second differential case 98 includes a second cylindrical end portion 116 protruding to the side opposite to the first differential case 96 and provided with an annular groove 136 and a second delivery oil passage 138 making up a portion of a lubricant oil supplying device 118 described later.

The side gear 92 of the pair of the side gears 92 closer to the electric motor 24 is coupled on the inner circumferential side to the shaft end portion of the one drive shaft 22 in a relatively non-rotatable manner by the spline fitting, for example. The side gear 92 of the pair of the side gears 92 further from the electric motor 24 is coupled on the inner circumferential side to the shaft end portion of the other drive shaft 22 in a relatively non-rotatable manner by the spline fitting, for example. The one drive shaft 22 is rotatably supported around the shaft center C1 by the inner circumferential surface of the input shaft 66, for example, and the other drive shaft 22 is rotatably supported around the shaft center C1 by the inner circumferential surface of the second cylindrical end portion 116 of the second differential case 98.

The differential gear device 36 configured as described above is rotationally driven by the speed reducer 34 to transmit a drive force to a pair of the drive shafts 22 disposed on the shaft center C1 while allowing a rotational difference between the drive shafts 22.

As depicted in FIG. 3, the vehicle driving device 10 includes the lubricant oil supplying device 118 for supplying lubricant oil to, for example, lubrication sites such as a gear engagement site and a site between two relatively rotating members of the electric motor 24, the speed reducer 34, and the differential gear device 36 configured as above. The lubricant oil supplying device 118 includes the internal gear type oil pump 120 fixed to the inside bottom surface of the bottom wall 112 of the bottomed cylindrical case 44, a suction oil passage 124 for guiding the lubricant oil accumulated in the oil pan 52 through a strainer 122 to the oil pump 120, and the delivery oil passage 126 branched into a plurality of parts on the way for guiding the lubricant oil sucked through the suction oil passage 124 and pressurized by the oil pump 120 to the lubrication sites.

As depicted in FIG. 5, the suction oil passage 124 is made up of a first suction oil passage 128 that is in communication through the strainer 122 with a lubricant oil accumulation space A2 formed by the opening portion in the lower side surface of the cylindrical case 38 and the oil pan 52 and that opens in the one opening surface 42 of the cylindrical case 38 and a second suction oil passage 134 that opens in the opening surface 40 of the bottomed cylindrical case 44 oppositely to the first suction oil passage 128 to be in communication with the first suction oil passage 128 and that opens in a bottom surface of a fitting recess portion 130 formed inside the bottom wall 112 of the bottomed cylindrical case 44 to be in communication with a pump chamber 132 of the oil pump 120. As indicated by a broken line arrow B of FIG. 5, the suction oil passage 124 supplies the lubricant oil from the lubricant oil accumulation space A2 via the strainer 122, the first suction oil passage 128, and the second suction oil passage 134 to the oil pump 120.

The delivery oil passage 126 includes a first delivery oil passage not shown that opens in the bottom surface of the fitting recess portion 130 to be in communication with the pump chamber 132 of the oil pump 120 and that is in communication with the annular groove 136 formed in the outer circumferential surface of the second cylindrical end portion 116 of the second differential case 98, the annular groove 136, the second delivery oil passage 138 formed in the second cylindrical end portion 116 for allowing communication between the annular groove 136 and the differential case internal space A1, the differential case internal space A1, and a cylindrical space A3 formed between the input shaft 66 and the one drive shaft 22 to be in communication with the differential case internal space A1.

Figure 8:
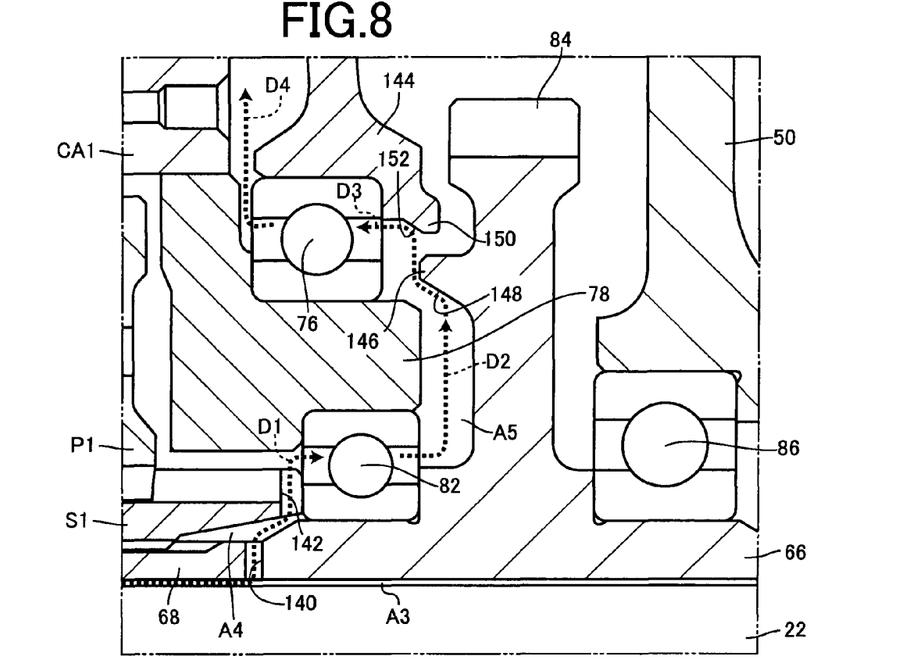
FIG. 8 is an enlarged diagram of a VIII arrow view portion of FIG. 5.

FIG. 8 is an enlarged diagram of a VIII arrow view portion of FIG. 5. As depicted in FIG. 8, the delivery oil passage 126 also includes a plurality of oil holes 140 (only one is depicted in FIG. 8) that are disposed in the input shaft 66, for example, at circumferentially regular intervals in a radially penetrating manner to be in communication with the cylindrical space A3 and that is in communication with a first annular space A4 formed between the inner circumferential surface of the sun gear S1 and the outer circumferential surface of the input shaft 66, the first annular space A4, a plurality of oil grooves 142 (only one is depicted in FIG. 8) that is in communication with the first annular space A4 and that is formed in an end surface of the sun gear S1 abutting on an inner ring of the second bearing 82, for example, at circumferentially regular intervals in a radially penetrating manner to be capable of supplying the lubricant oil to the second bearing 82, and a second annular space A5 formed between the first bearing 76, the shaft end portion 78, and the second bearing 82 and the parking lock gear 84 in the shaft center C1 direction to be capable of discharging the lubricant oil from the second bearing 82 and supplying the lubricant oil to the first bearing 76.

As indicated by a broken line arrow D of FIG. 5, the delivery oil passage 126 supplies the lubricant oil from the pump chamber 132 of the oil pump 120 via the first delivery oil passage, the annular groove 136, the second delivery oil passage 138, and the differential case internal space A1 to the cylindrical space A3. As indicated by the broken line arrow D of FIG. 5 and a broken line arrow D1 of FIG. 8, the lubricant oil is supplied from the cylindrical space A3 via the oil holes 140, the first annular space A4, and the oil grooves 142 to the second bearing 82. As indicated by the broken line arrow D of FIG. 5 and broken line arrows D2 to D3 of FIG. 8, the lubricant oil is supplied from the second bearing 82 via the second annular space A5 to the first bearing 76. The lubricant oil supplied to the first bearing 76 is discharged to the outer circumferential side as indicated by the broken line arrow D of FIG. 5 and a broken line arrow D4 of FIG. 8.

As depicted in FIG. 8, an opposite portion in one surface of the parking lock gear 84 toward the first bearing 76 is provided with an annular inner circumferential guide protruding portion 146 that integrally protrudes at the inner circumferential side than an inner circumferential end portion 144 of the support wall 54 for fitting and attaching an outer ring of the first bearing 76 from the opposite portion in one surface of the parking lock gear 84 toward the first bearing 76 to be closer to the first bearing 76 than the end surface of the inner circumferential end portion 144 toward the parking lock gear 84. The inner circumferential guide protruding portion 146 includes a first tapered inner circumferential surface 148 having the inner diameter continuously increasing toward the first bearing 76. The inner circumferential guide protruding portion 146 is designed to guide the lubricant oil that passes through the second bearing 82 for lubrication, that enters into the second annular space A5, and that travels to the outer circumferential side due to the centrifugal force, along the first tapered inner circumferential surface 148 toward the first bearing 76 as indicated by the broken line arrow D2 of FIG. 8.

At the end portion of the inner circumferential end portion 144 toward the parking lock gear 84, an annular outer circumferential guide protruding portion 150 is disposed that integrally protrudes to the inner circumferential side while integrally protruding closer to the parking lock gear 84 than the end surface of the inner circumferential guide protruding portion 146 toward the first bearing 76. The outer circumferential guide protruding portion 150 and the inner circumferential guide protruding portion 146 are arranged on the outer circumferential side and the inner circumferential side to overlap with each other in the traveling direction of the lubricant oil that goes to the outer circumferential side due to the centrifugal force, i.e., the radial direction. The outer circumferential guide protruding portion 150 includes a second tapered inner circumferential surface 152 having the inner diameter continuously increasing toward the first bearing 76. The outer circumferential guide protruding portion 150 is designed to guide the lubricant oil that travels to the outer circumferential side due to the centrifugal force after being guided toward the first bearing 76 by the inner circumferential guide protruding portion 146, along the second tapered inner circumferential surface 152 toward the first bearing 76 as indicated by the broken line arrow D3 of FIG. 8. The outer circumferential guide protruding portion 150 also has a functional role in preventing the lubricant oil that travels to the outer circumferential side due to the centrifugal force after being guided toward the first bearing 76 by the inner circumferential guide protruding portion 146 from going between the parking lock gear 84 and the inner circumferential end portion 144.

To the first bearing that rotatably supports the carrier CA1 making up the speed reducer 34 coupled to the subsequent stage of the electric motor 24 rotated at a higher speed as compared to, for example, an engine, the lubricant oil is sufficiently guided from the inner circumferential side by the inner circumferential guide protruding portion 146 and the outer circumferential guide protruding portion 150.

Referring to FIG. 5 again, the delivery oil passage 126 is provided with oil passages for supplying the lubricant oil to the electric motor 24 and oil passages for supplying the lubricant oil to the gear engagement sites of the rotating elements of the speed reducer 34, for example, along with those described above.

Figure 9:
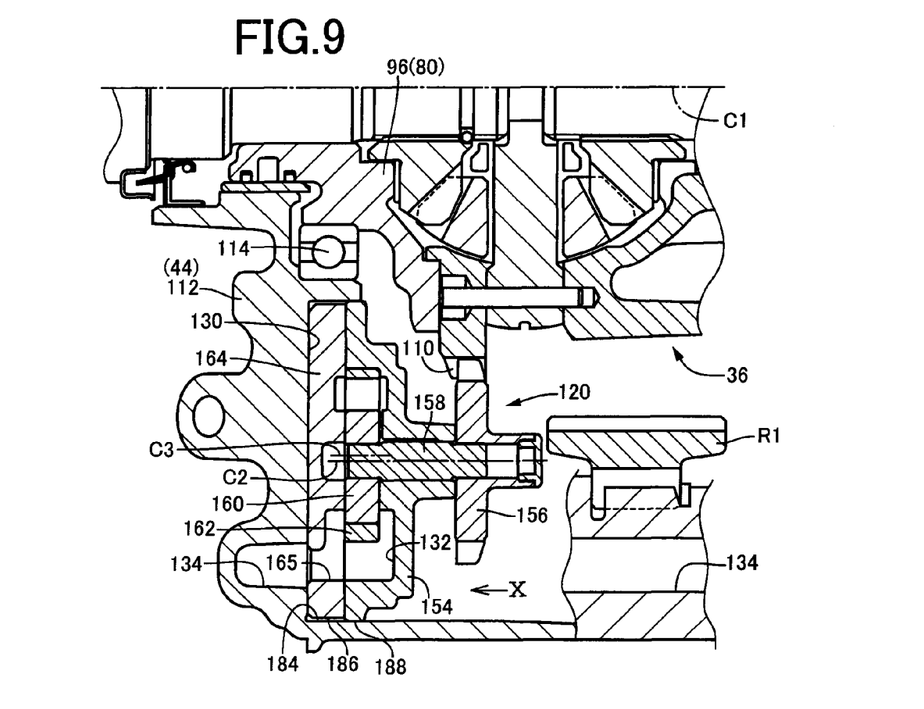
FIG. 9 is an enlarged cross-section diagram of the oil pump depicted in FIG. 5 along with peripheral members including the oil pump.

FIG. 9 is an enlarged cross-section diagram of the oil pump 120 depicted in FIG. 5 along with peripheral members including the oil pump 120. As depicted in FIG. 9, the oil pump 120 includes a short cylindrical pump body 154 having the pump chamber 132 that is recessed oppositely to the bottom surface of the fitting recess portion 130 of the bottomed cylindrical case 44 to be connected to the second suction oil passage (suction oil passage) 134 opening in the bottom surface and the first delivery oil passage; a pump shaft 158 that is provided to penetrate the pump body 154 while being rotatably supported by the pump body 154 and that has one end portion fit in a relatively non-rotatable manner with the pinion 156 engaging with outer circumferential teeth 110 disposed in the first differential case 96; an external gear type drive gear (rotor) 160 that is provided concentrically to the pump shaft 158 while being fit in a relatively non-rotatable manner with the other end portion of the pump shaft 158 and that is rotationally driven around a shaft center C2 in parallel with the shaft center C1 along with the pump shaft 158 when the pump shaft 158 is rotationally driven by the first differential case 96 via the outer circumferential teeth 110 and the pinion 156; an internal gear type driven gear (rotor) 162 that is engaged with the drive gear 160 and that is fit into the pump chamber 132 so as to be rotatable around a shaft center C3 eccentric to the shaft center C2; and a pump cover 164 that is disposed between the pump body 154 and the bottom wall 112 of the bottomed cylindrical case 44 in the fitting recess portion 130 and that is fixed to the pump body 154 to make the drive gear 160 and the driven gear 162 unable to be pulled out from the pump chamber 132. The pump body 154 and the pump cover 164 are made of die-cast aluminum alloy, for example, and the drive gear 160 and the driven gear 162 are molded by sintering (powder metallurgy), for example. Although the pump cover 164 has a communication hole 165 that allows communication between the pump chamber 132 of the pump body 154 and each of the second suction oil passage 134 and the first delivery oil passage opening in the bottom surface of the fitting recess portion 130, the pump cover 164 accurately connects the pump chamber 132 and the second suction oil passage 134 and the first delivery oil passage because of being made by die-casting as described above.

Figure 10:
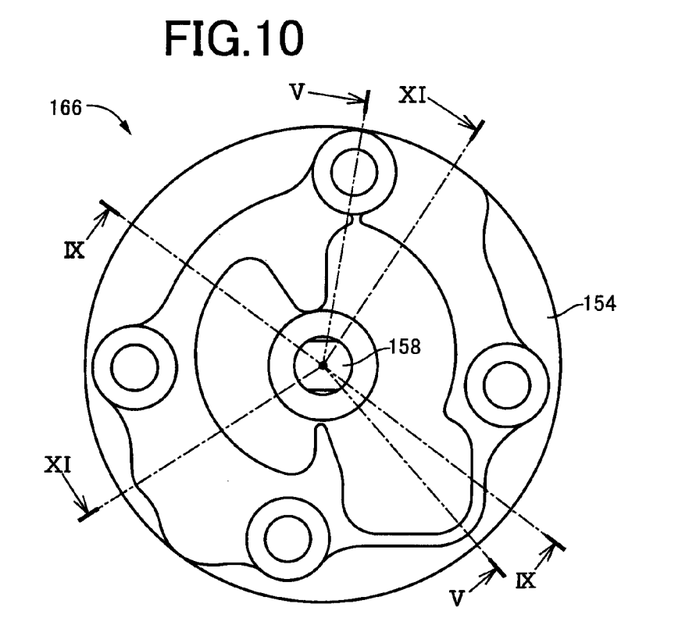
FIG. 10 depicts the pump body, the pump cover, the drive gear, the driven gear, and the pump shaft assembled to each other in advance before the fixation to the bottomed cylindrical case, i.e., an oil pump sub-assembly viewed from the direction corresponding to an X arrow view direction of FIG. 9.
Figure 11:
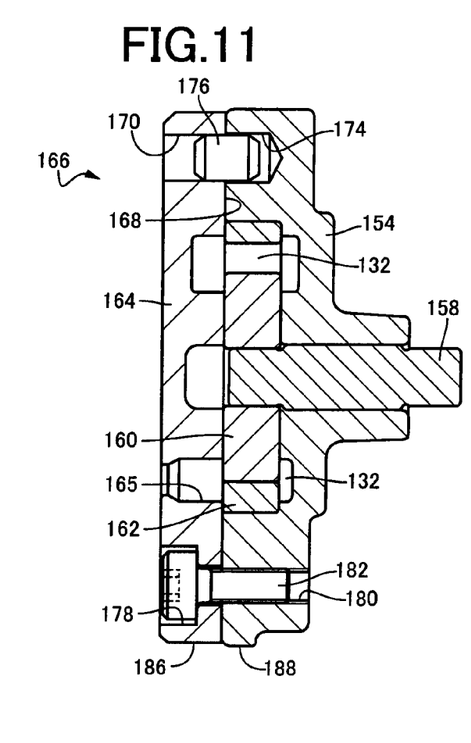
FIG. 11 is a cross-section diagram of a cross-section of the IX-IX arrow view portion of FIG. 10.

FIG. 10 depicts the pump body 154, the pump cover 164, the drive gear 160, the driven gear 162, and the pump shaft 158 assembled to each other in advance before the fixation to the bottomed cylindrical case 44, i.e., an oil pump sub-assembly 166 viewed from the direction corresponding to an X arrow view direction of FIG. 9. The oil pump 120 depicted in FIG. 5 is depicted as a V-V arrow view portion cross-section of FIG. 10 and the oil pump 120 depicted in FIG. 9 is depicted as a IX-IX arrow view portion cross-section of FIG. 10. FIG. 11 is a cross-section diagram of a cross-section of the XI-XI arrow view portion of FIG. 10. As depicted in FIG. 10 or FIG. 11, the pump body 154 and the pump cover 164 are relatively positioned to some extent in the direction orthogonal to the shaft center C2 by a pair of positioning pins 176 having one end portions pressed into a pair of pin press fit holes 170 disposed in a first combination surface 168 of the pump cover 164 for the pump body 154 and other end portions loosely fit into a pair of positioning pin holes 174 disposed oppositely to the pair of the pin press fit holes 170 in a second combination surface 172 of the pump body 154 for the pump cover 164 in a state of fitting leaving a gap. The positioning pins 176 position the pump body 154 and the pump cover 164 in a state permitting a relative movement by the gap between the positioning pins 176 and the positioning pin holes 174. In the pump cover 164, a spot facing hole 178 is formed oppositely to the bottom surface of the fitting recess portion 130, and the pump body 154 and the pump cover 164 are fastened to each other by a hexagonal hole head bolt (headed bolt) 182 that has a head with a length in the shaft center direction shorter than the spot facing depth of the spot facing hole 178 to be inserted into the spot facing hole 178 such that the head is hidden in the spot facing hole 178 and that is threaded into a female screw 180 formed in the pump body 154. Even if loosened, the hexagonal hole head bolt 182 is not drop off since the bolt hits against the bottom wall 112 of the bottomed cylindrical case 44.

Referring to FIG. 9 again, the pump body 154 is fit into the fitting recess portion 130 having a cylindrical inner circumferential surface 184 formed in the bottom surface of the bottomed cylindrical case 44 to be positioned in the direction orthogonal to the shaft center C2 relatively to the bottomed cylindrical case 44. As a result, the pump shaft 158 rotatably supported by the pump body 154 and the differential case 80 rotatably supported via the differential side bearing 114 by the bottomed cylindrical case 44 are positioned to each other in the direction orthogonal to the shaft center C1.

An outer circumferential surface 186 of the pump cover 164 is set to be located at the inner circumferential side than a cylindrical outer circumferential surface 188 of the pump body 154 regardless of an amount of movement of the pump cover 164 relative to the pump body 154 in accordance with the gap between the positioning pins 176 and the positioning pin holes 174. As a result, a predetermined annular gap is formed between the outer circumferential surface 186 of the pump cover 164 and the cylindrical inner circumferential surface 184 of the fitting recess portion 130. Therefore, the pump body 154 is fit into the fitting recess portion 130 such that the cylindrical outer circumferential surface 188 can engage with the cylindrical inner circumferential surface 184 of the fitting recess portion 130 at any circumferential position.

Figure 12:
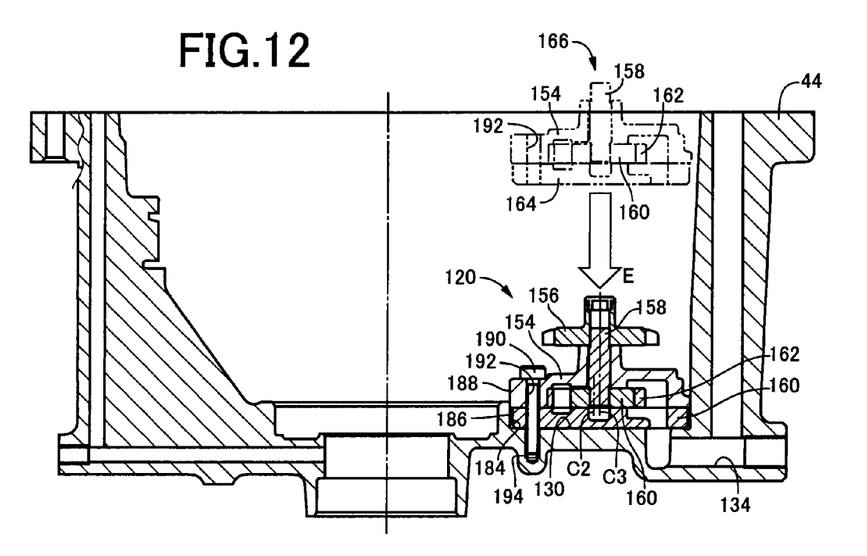
FIG. 12 depicts how the oil pump sub-assembly is assembled to the bottomed cylindrical case.

FIG. 12 depicts how the oil pump sub-assembly 166 is assembled to the bottomed cylindrical case 44. As depicted in FIG. 12, the oil pump sub-assembly 166 is fit into the fitting recess portion 130 of the bottomed cylindrical case 44 disposed with the opening facing upward in consideration of assembly property as indicated by an arrow E of FIG. 12. Since the pump cover 164 is fastened to the pump body 154 by the bolt 182, the driven gear 162 and the drive gear 160 are prevented from dropping off from the pump chamber 132 by the pump cover 164. The oil pump sub-assembly 166 is fixed to the bottomed cylindrical case 44 by inserting hexagonal hole head bolts 190 into a plurality of through-holes 192 circumferentially arranged and penetrating the pump body 154 and the pump cover 164 in the thickness direction and by screwing the bolts into a plurality of female screws 194 respectively, formed in the bottom surface of the fitting recess portion 130 oppositely to the through-holes 192. The oil pump 120 is attached to the bottomed cylindrical case 44 as the oil pump sub-assembly 166 formed by assembling the pump body 154, the drive gear 160, the driven gear 162, the pump shaft 158, and the pump cover 164 to each other in advance.

The pinion 156 is fit into the pump shaft 158, and the differential gear device 36 and the speed reducer 34 are assembled to the bottomed cylindrical case 44 in predetermined order. As depicted in FIG. 5, in the state after the members including the oil pump 120 and the ring gear R1 are assembled, the pinion 156 is prevented from slipping off from the pump shaft 158 by the ring gear R1 adjacently disposed in the shaft center C2 direction. The ring gear R1 is a member making up a speed reducer disposed within a transaxle case.

As described above, according to the transaxle portion 28 acting as the power transmission device of this embodiment, since the differential gear device 36 includes the first differential case 96 formed such that the radial distance t1 of the annular gap formed between the first cylindrical end portion (cylindrical end portion) 100 extended to the outer circumferential side of the snap ring 90 fit and attached to the shaft end portion 68 of the input shaft 66 and the snap ring 90 is set smaller than the groove depth t2 of the snap ring groove 88, the snap ring 90 abuts on the inner circumferential surface of the first cylindrical end portion 100 before completely slipping off from the snap ring groove 88 even if the snap ring 90 is affected by an external force, for example, a centrifugal force or thrust force and, therefore, the snap ring 90 fixed and attached to the input shaft 66 for preventing the slip-off of the sun gear S1 fit with the input shaft 66 adjacent to the differential gear device 36 in the shaft center C1 direction is retained within the snap ring groove 88.

According to the transaxle portion 28 of this embodiment, since the oil seal 103 is included that forms oil-tight seal between the inner circumferential surface of the first cylindrical end portion 100 and the outer circumferential surface of the shaft end portion 68 of the input shaft 66 and the radial distance t1 is set such that the snap ring 90 abuts on the first cylindrical end portion 100 so as not to exceed the predetermined allowable deformation range in the radial direction of the oil seal 103 even if the input shaft 66 and the first differential case 96 are relatively moved in the radial direction, an amount of deformation of the oil seal 103 is maintained within the allowable deformation range and therefore the sealing state is maintained between the input shaft 66 and the first differential case 96 by the oil seal 103.

According to the transaxle portion 28 of this embodiment, since the first cylindrical end portion 100 is provided with the gap reducing portion 108 that reduces the volume of the annular gap formed between the inner circumferential surface thereof and the outer circumferential surface of the shaft end portion 68 of the input shaft 66 to decrease an amount of lubricant oil retained in the gap, when the first differential case 96 rotates while the annular gap retains the lubricant oil, a bias force applied to the oil seal 103 from the retained lubricant oil toward the side opposite to the gap is smaller as compared to the case of absence of the gap reducing portion 108 and, therefore, the oil seal 103 can be restrained from moving toward the side opposite to the gap, i.e., from dropping off from the first differential case 96.

According to the transaxle portion 28 of this embodiment, since the input shaft 66 is rotationally driven by the electric motor 24 disposed on the shaft center C1, even if the input shaft 66 is rotationally driven by the electric motor 24 rotating at a higher speed as compared to an engine, etc., and the snap ring 90 is affected by a higher centrifugal force, the snap ring 90 is retained in the snap ring groove 88 in a preferred manner.

Second Embodiment

Another embodiment of the present invention will then be described. In the following description of the embodiment, the portions overlapping with the embodiment described above are denoted by the same reference numerals and will not be described.

Figure 13:
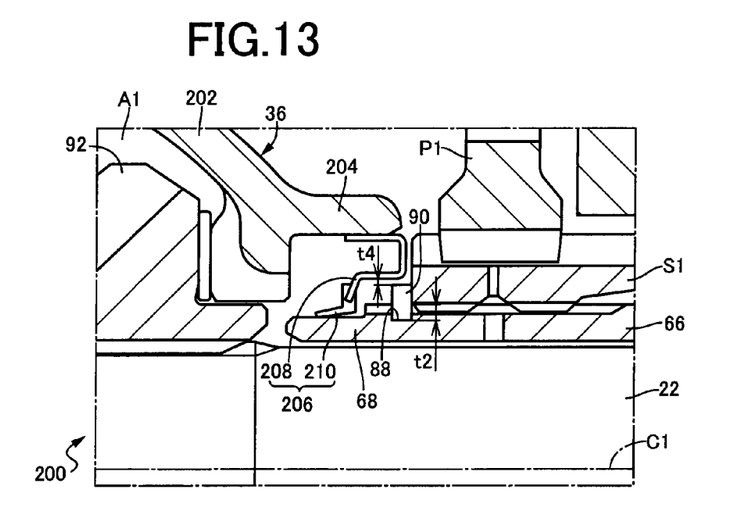
FIG. 13 is an enlarged cross-section diagram of a site corresponding to the VI arrow view portion of FIG. 5 in the first embodiment in a transaxle portion of another embodiment of the present invention and is a diagram corresponding to FIG. 6 of the first embodiment.

FIG. 13 is an enlarged cross-section diagram of a site corresponding to the VI arrow view portion of FIG. 5 in the first embodiment in a transaxle portion (power transmission device) 200 of another embodiment of the present invention and is a diagram corresponding to FIG. 6 of the first embodiment. As depicted in FIG. 13, a first differential case 202 of this embodiment includes a first cylindrical end portion (cylindrical end portion) 204 extended to the outer circumferential side of the shaft end portion 68 of the input shaft 66. In an annular gap formed between the inner circumferential surface of the first cylindrical end portion 100 and the outer circumferential surface of the shaft end portion 68 of the input shaft 66, an oil seal 206 is disposed that seals the gap in an oil tight manner. The oil seal 206 of this embodiment includes an annular cored bar 208 made of metal, for example, fit and attached to the inner circumferential surface of the first cylindrical end portion 204 and a sealing member (lip) 210 made of synthetic resin, for example, fixed to the inner circumferential side of the cored bar 208.

The cored bar 208 is formed, for example, by applying a bending process to an annular disc metal plate and is formed such that a radial distance t4 of an annular gap formed between the cored bar 208 and the snap ring 90 is set smaller than the groove depth t2 of the snap ring groove 88. Therefore, although the snap ring 90 may be deformed to the outer circumferential side or/and toward the differential gear device 36 due to the centrifugal force and the thrust force acting thereon, the slip-off is prevented since the snap ring 90 abuts on the cored bar 208 before completely slipping off from the snap ring groove 88. The radial distance t4 is set such that the snap ring 90 abuts on the cored bar 208 so as not to exceed a predetermined allowable deformation range in the radial direction of the oil seal 206 even if the input shaft 66 and the first differential case 202 are relatively moved in the radial direction.

The transaxle portion 200 acting as the power transmission device of this embodiment has the configuration same as that of the first embodiment except the above description and since the differential gear device 36 includes the first cylindrical differential case 202 formed such that the radial distance t4 of the annular gap formed between the cored bar 208 fixed to the first cylindrical end portion (cylindrical end portion) 204 and the snap ring 90 is set smaller than the groove depth t2 of the snap ring groove 88, the snap ring 90 abuts on the inner circumferential surface of the cored bar 208 before completely slipping off from the snap ring groove 88 even if the snap ring 90 is affected by an external force, for example, a centrifugal force or thrust force and, therefore, as is the case with the first embodiment, the snap ring 90 fixed and attached to the input shaft 66 for preventing the slip-off of the sun gear S1 fit with the input shaft 66 adjacent to the differential gear device 36 in the shaft center C1 direction is retained within the snap ring groove 88.

Although the embodiments of the present invention have been described in detail with reference to the drawings, the present invention is not limited to the embodiments and may be implemented in other forms.

For example, although the first cylindrical end portion 100 is extended to the outer circumferential side of the snap ring 90 or the cored bar 208 of the oil seal 206 fixed to the first cylindrical end portion 204 is extended to the outer circumferential side of the snap ring 90 in the embodiments, these are not limitations and other members fixed to the first cylindrical end portions 100 and 204 may be extended to the outer circumferential side of the snap ring 90.

Although the vehicle driving device 10 includes the electric motor 24 and the speed reducer 34 in the embodiments, the electric motor 24 and the speed reducer 34 are not necessarily be included. For example, instead of the electric motor 24, output of an engine may be input to the speed reducer 34. The output of the electric motor 24 may directly be output to the differential gear device 36 without including the speed reducer 34.

The gap reducing portion 108 disposed on the first cylindrical end portion 100 of the first embodiment may not necessarily be disposed.

Although the sun gear S1 is a helical gear in the embodiments, the sun gear S1 may be another gear such as a spur gear. Although the snap ring 90 may be deformed to the outer circumferential side due to the centrifugal force and may not be retained in the snap ring groove 88 even in such a case, the snap ring 90 is retained in the snap ring groove 88 in a preferred manner according to the present invention.

Although the vehicle 12 of the embodiments is of the FF type, the vehicle may be of the FR (front-motor rear-drive) type, for example, or a vehicle employing another drive type.

The pump cover 164 of the oil pump 120 of the embodiments may not necessarily be included.

The inner circumferential guide protruding portion 146 disposed on the parking lock gear 84 and the outer circumferential guide protruding portion 150 disposed on the inner circumferential end portion 144 of the support wall 54 in the embodiments may not necessarily be disposed.

It is to be understood that the above are merely exemplary embodiments and that the present invention may be implemented in variously modified or altered forms based on the knowledge of those skilled in the art without departing from the spirit thereof although not exemplary illustrated one by one.

What is claimed is:

1. A vehicle power transmission device comprising: a cylindrical input shaft; a planetary gear type speed reducer disposed concentrically to the input shaft to reduce and output rotation input to the input shaft; and a differential gear device disposed adjacently to the input shaft in a shaft center direction, the differential gear device being rotationally driven by the speed reducer to transmit a drive force to a pair of axles disposed on the shaft center while allowing a rotational difference between the axles, the speed reducer including a sun gear that is fit with a shaft end portion of the input shaft in a relatively non-rotatable manner, the sun gear being prevented from relatively moving toward the differential gear device by an annular snap ring fit and attached to an annular snap ring groove formed on an outer circumferential surface of the shaft end portion of the input shaft on the differential gear device side of the sun gear, the differential gear device including a differential case having a cylindrical end portion formed on the sun gear side or a member fixed thereto that is extended to the outer circumferential side of the snap ring, the differential case having a radial distance of an annular gap formed between the cylindrical end portion or the member fixed thereto and the snap ring set smaller than a groove depth of the snap ring groove, the member fixed to the cylindrical end portion being a cored bar of an oil seal fixed and attached to the inner circumferential surface of the cylindrical end portion for forming an oil-tight seal between the inner circumferential surface of the cylindrical end portion and the outer circumferential surface of the shaft end portion of the input shaft.

2. The vehicle power transmission device of claim 1, wherein the input shaft is rotationally driven by an electric motor disposed on the shaft center.

3. The vehicle power transmission device of claim 1, comprising an oil seal that forms an oil-tight seal between an inner circumferential surface of the cylindrical end portion of the differential case and the outer circumferential surface of the shaft end portion of the input shaft, wherein the radial distance is set such that the snap ring abuts on the cylindrical end portion or the member fixed thereto such that a deformation amount of the oil seal does not exceed a predetermined allowable deformation range even when the differential case and the input shaft are relatively moved in a radial direction.

4. The vehicle power transmission device of claim 3, wherein the input shaft is rotationally driven by an electric motor disposed on the shaft center.

5. The vehicle power transmission device of claim 3, wherein the cylindrical end portion has a gap reducing portion that reduces a volume of an annular gap formed between the inner circumferential surface of the cylindrical end portion and the outer circumferential surface of the shaft end portion of the input shaft to decrease an amount of lubricant oil retained in the gap.

6. The vehicle power transmission device of claim 5, wherein the input shaft is rotationally driven by an electric motor disposed on the shaft center.

7. The vehicle power transmission device of claim 1, wherein the cylindrical end portion has a gap reducing portion that reduces a volume of an annular gap formed between the inner circumferential surface of the cylindrical end portion and the outer circumferential surface of the shaft end portion of the input shaft to decrease an amount of lubricant oil retained in the gap.

8. The vehicle power transmission device of claim 7, wherein the input shaft is rotationally driven by an electric motor disposed on the shaft center.

* * * * *